United States Patent
O'Farrell et al.

(10) Patent No.: US 8,645,938 B2
(45) Date of Patent: Feb. 4, 2014

(54) SYSTEM AND METHOD FOR REPLACING CODE

(75) Inventors: Bill O'Farrell, Markham (CA); Shu Tan, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 1525 days.

(21) Appl. No.: 11/561,107

(22) Filed: Nov. 17, 2006

(65) Prior Publication Data

US 2008/0120595 A1   May 22, 2008

(51) Int. Cl.
*G06F 9/44* (2006.01)

(52) U.S. Cl.
USPC .......................... 717/169; 717/170

(58) Field of Classification Search
USPC .............. 717/106–108, 110–111, 168–173
See application file for complete search history.

(56) References Cited

U.S. PATENT DOCUMENTS

| | | | | |
|---|---|---|---|---|
| 5,590,331 | A * | 12/1996 | Lewis et al. | 717/144 |
| 5,815,722 | A * | 9/1998 | Kalwitz et al. | 717/178 |
| 5,862,384 | A * | 1/1999 | Hirai | 717/160 |
| 5,973,696 | A * | 10/1999 | Agranat et al. | 715/760 |
| 6,351,843 | B1 | 2/2002 | Berkley et al. | |
| 6,412,106 | B1 | 6/2002 | Leask | |
| 6,490,721 | B1 | 12/2002 | Gorshkov et al. | |
| 6,631,500 | B1 * | 10/2003 | Kumhyr | 715/236 |
| 6,633,876 | B1 * | 10/2003 | Heatlie | 717/128 |
| 7,665,076 | B2 * | 2/2010 | Clement et al. | 717/148 |
| 7,765,281 | B1 * | 7/2010 | Crow et al. | 709/219 |
| 7,814,479 | B2 * | 10/2010 | Douglas et al. | 717/173 |
| 2001/0020295 | A1 * | 9/2001 | Satoh | 717/11 |
| 2003/0005409 | A1 | 1/2003 | Tumati | |
| 2003/0226068 | A1 | 12/2003 | Rule | |
| 2005/0034109 | A1 | 2/2005 | Hamilton et al. | |
| 2006/0005171 | A1 * | 1/2006 | Ellison | 717/131 |
| 2008/0196019 | A1 * | 8/2008 | Meller et al. | 717/168 |

OTHER PUBLICATIONS

Stoodley, Kevin, "IBM Java Technology", IBM Corp., Apr. 1, 2003, 70pg.*

* cited by examiner

*Primary Examiner* — Li B Zhen
*Assistant Examiner* — Ryan Coyer
(74) *Attorney, Agent, or Firm* — David Mims; Robert C. Rolnik (57) ABSTRACT

Computer-implemented methods, computer program products and data processing systems for transmitting a target code module to a server that is executing a computer program capable of using the target code module, and for obtaining the target code module at the server. The target code module is encapsulated in a base language code module, and the base language code module is transmitted to the server. The server receives the base language code module having the target code module encapsulated therein, and extracts the target code module from the base language code module.

12 Claims, 7 Drawing Sheets

SYSTEM AND METHOD FOR REPLACING CODE

FIELD OF THE INVENTION

The present invention relates to debugging of computer program code, and more particularly to debugging using "hot code replace" (herein "HCR").

BACKGROUND OF THE INVENTION

Computer software comprises a set of instructions to be executed by a data processing system. Generally, it is the computer software which makes a data processing system useful, by providing the instructions for the data processing system to carry out productive tasks. Computer software provides instructions that enable a data processing system to function as, for example, a word processing device, spreadsheet device, or an Internet browsing device.

There are a wide variety of different data processing systems capable of using computer software. Accordingly, as used herein, the term "data processing system" is intended to have a broad meaning, and may include personal computers, laptop computers, palmtop computers, handheld computers, network computers, servers, mainframes, workstations, cellular telephones and similar wireless devices, personal digital assistants and other electronic devices on which computer software may be installed. The terms "computer", "computer software", "computer program", "computer programming", "software", "software program" and related terms are intended to have a similarly broad meaning.

Generally, modern computer software is originally written in a computer programming language using syntactic constructs that are comprehensible by a programmer to represent the instructions embodied in the software. For example, in the "C" programming language, the syntactic term "printf" is used to represent an instruction to the data processing system to print the contents of a particular data field. These types of computer programming languages are useful because their syntactic constructs make it easier for programmers to create computer software, since they do not need to compose instructions in a language that would be directly understood by the data processing system. Writing instructions in such a language would be far more difficult because such languages bear little or no resemblance to any human language. A computer program, or a portion thereof, written with such a human-comprehensible programming language is generally referred to as "source code". Software developers can create source code either by directly authoring the source code (for example by entering the instructions into a text editor), or, more recently, by using specialized software programs that provide a specially designed user interface and that partially or substantially automate the generation of source code.

Instructions written in human-comprehensible source code, however, generally cannot be directly understood and implemented by a data processing system. Therefore, before a computer program written in human-comprehensible computer programming language (i.e. source code) may be used by a data processing system, it must first be "compiled" into language that will be understood by the target data processing system. Compiling is a process, usually carried out by a computer program called a "compiler", in which the syntactic constructs of the human-comprehensible computer programming language are in essence translated into instructions in a language that will be understood by the target data processing system (possibly through an intermediate software layer). The result of the "compiling" or "compilation" process is known as "executable code", meaning computer program code that can be executed by the data processing system either directly or by an intermediate software layer. Executable code is generally platform-specific, meaning that it can only be executed by a specific type of computer system. Accordingly, source code must generally be compiled in a specific way to be executed by a given type of computer.

For certain computer programming languages, such as Java™, the source code is first compiled into an intermediate form that can be implemented by an intermediate software layer, such as a Java virtual machine (hereinafter "JVM"). In Java, this intermediate form is known as "bytecode". (Java and all Java-based trademarks are trademarks of Sun Microsystems, Inc. in the United States, other countries, or both.) Typically, but not necessarily, the intermediate software layer will carry out additional compilation each time the computer program is run, usually to translate the intermediate form of the source code into executable code that can be directly executed by the data processing system. While the JVM itself is platform-specific, it enables any computer having a compatible JVM to execute a Java program that has been compiled into bytecode, without the Java program having to have been compiled in a platform-specific way.

Software developers, being human, are not perfect. As a result, when software developers create or modify computer programs, these programs frequently contain errors which cause the program to perform in a manner that was not intended. These errors are referred to as "bugs", and the process of identifying and correcting these errors is referred to as "debugging".

Originally, it was necessary for the software developer to make the correction in the source code, and then compile the entire source code program into executable code. This process of correcting errors in the source code and then compiling the entire program again is time consuming, particularly where only a single file needs to be modified.

In modern programming systems, debuggers are used to assist programmers in locating problems in their programs by enabling the setting of breakpoints in the code, and allowing the user to view and alter variables dynamically. More advanced systems allow users to modify their programs as they are debugging them, with the modified program replacing the original instantaneously. Such a feature is called "Hot Code Replace" (hereinafter "HCR"). In particular, a software developer would use a computer program known as an application development tool, usually having a graphical user interface (hereinafter "GUI"), to modify the software program that is being debugged. The application development tool is configured so that it can, in response to the developer's changes, build a single unit of code (e.g. a Java class) embodying those changes without having to rebuild the entire program. The original code unit is then replaced with the new code unit incorporating the developer's changes. An example of such a system is the Eclipse programming environment running with a compatible JVM. Unfortunately, this HCR feature is limited by the environment to Java programs only.

HCR could be very useful for high-level languages and visual paradigms such as BPEL (Business Processing Execution Language), Message Flows, Data Maps, Business Rules, and the like. As used herein, the term "high-level language" refers to a language wherein the operations and data structures denoted in the language are strongly related to a problem domain, such as, for example, business processes. Because of this, such languages may be relatively difficult to compile directly into executable code, and these languages and systems therefore often have their own specialized intermediate software layer (or "engine") for executing programs written in that language. Typically, the specialized intermediate software layer will generate instructions in a "base language" (e.g. Java) that will then be interpreted by an underlying intermediate software layer (e.g. a JVM) so as to cause the computer to implement the instructions embodied in source code written in the high-level language. As used herein, the term "base language" refers to a language wherein the operations and data structures denoted in the language are strongly related to machine-level concepts. Base languages are therefore relatively easy to compile into executable code. For clarity, intermediate software layers used to execute programs written in high-level languages will be referred to herein as "engines" (as noted above), so as to distinguish them from the underlying intermediate software layer for the "base language".

Unfortunately, the engines for high-level languages are frequently incompatible with the HCR functionality provided by the intermediate software layer for the lower level base language. Therefore, when using such high-level languages, a software developer often has to use the old method of changing the source code, compiling the program again, and then re-running the program to see the changes take effect. Even if the engine for the relevant high-level language could support HCR, it would be necessary to provide a mechanism to deliver changed programs to the intermediate software layer so that they could be incorporated into running system.

SUMMARY OF THE INVENTION

In one aspect, the present invention is directed to a computer-implemented method of transmitting a target code module to a server that is executing a computer program capable of using the target code module. The method comprises the steps of encapsulating the target code module in a base language code module and transmitting the base language code module to the server.

In one embodiment, the step of encapsulating the target code module in a base language code module comprises representing the target code module as a character string and building a base language code module having a first parameter comprising the character string. In a particular embodiment, the base language code module has a second parameter comprising a module identifier for the target code module and a third parameter comprising a version identifier for the target code module. In one embodiment, the target code module is written in a high level language.

In another aspect, the present invention is directed to a computer-implemented method of obtaining a target code module for integration into an executing computer program capable of using the target code module. The method comprises the steps of receiving a base language code module having the target code module encapsulated therein, and extracting the target code module from the base language code module. In one embodiment, the target code module is written in a high level language.

In other aspects, the present invention is directed to data processing systems and computer program products for implementing the above-described methods.

BRIEF DESCRIPTION OF THE DRAWINGS

The novel features believed characteristic of the invention are set forth in the appended claims. The invention itself, however, as well as a preferred mode of use, and further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
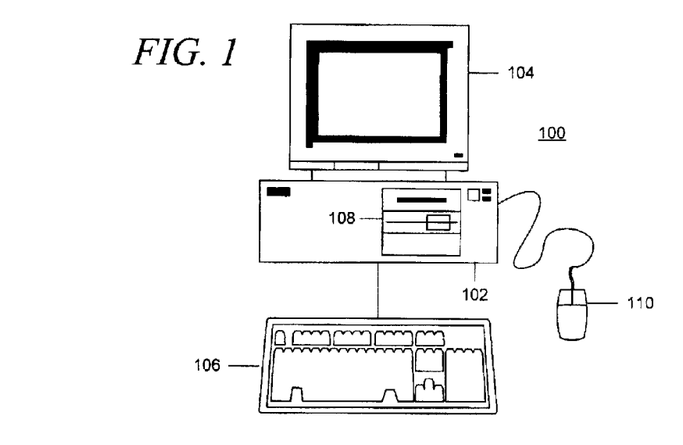
FIG. 1 is a pictorial representation of a data processing system in which aspects of the present invention may be implemented.

FIG. 1 is a pictorial representation of a data processing system in which aspects of the present invention may be implemented. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like.

Computer 100 may be implemented using any suitable computer, such as an IBM® eServer computer or IntelliStation® computer, which are products of International Business Machines Corporation, located in Armonk, N.Y. Although the depicted representation shows a personal computer, exemplary aspects of the present invention may be implemented in other types of data processing systems, such as laptop computers, palmtop computers, handheld computers, network computers, servers, workstations, cellular telephones and similar wireless devices, personal digital assistants and other electronic devices on which software programs may be installed. Computer 100 also preferably includes a graphical user interface (GUI) that may be implemented by means of systems software residing in computer readable media in operation within computer 100.

Figure 2:
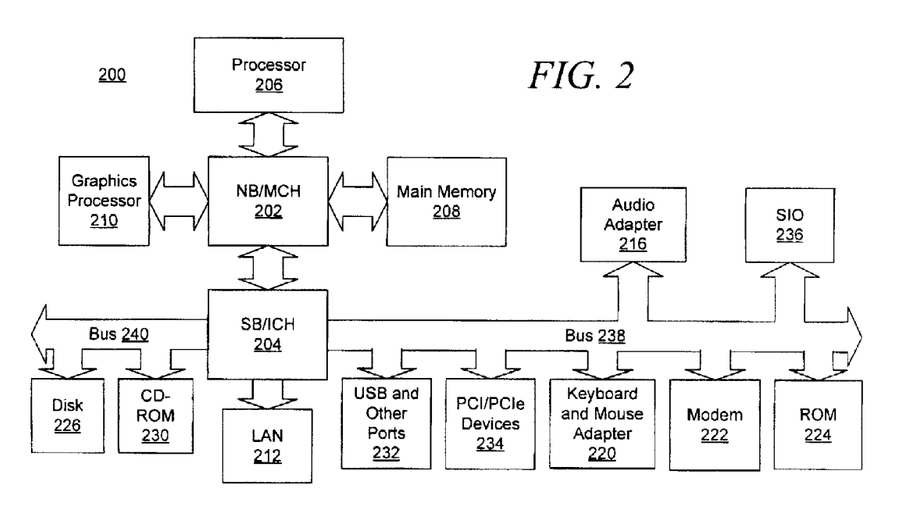
FIG. 2 is a block diagram of a data processing system in which aspects of the present invention may be implemented.

With reference now to FIG. 2, a block diagram of a data processing system is shown in which aspects of the present invention may be implemented. Data processing system 200 is an example of a computer, such as personal computer 100 in FIG. 1, in which code or instructions implementing the processes of the exemplary aspects may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are connected to north bridge and memory controller hub 202. Graphics processor 210 may be connected to the MCH 202 through an accelerated graphics port (AGP), for example.

In the depicted example, local area network (LAN) adapter 212 connects to south bridge and I/O controller hub 204 and audio adapter 216, keyboard and mouse adapter 220, modem 222, read only memory (ROM) 424, universal serial bus (USB) ports and other communications ports 232, and PCI/PCIe devices 234 connect to south bridge and I/O controller hub 204 through bus 238. Hard disk drive (HDD) 226 and CD-ROM drive 230 connect to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to south bridge and I/O controller hub 204.

A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java programming system, may run in conjunction with the operating system and provides calls to the operating system from Java programs or applications executing on data processing system 200.

Instructions for the operating system, the object-oriented programming system, and applications or programs are located on storage devices, such as hard disk drive 226, and may be loaded into main memory 208 for execution by processor 206. Aspects of the present invention may be performed by processor 206 using computer implemented instructions, which may be located in a memory such as, for example, main memory 208, read only memory 224, or in one or more peripheral devices.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which may be configured with flash memory to provide non-volatile memory for storing operating system files and/or user-generated data. A memory may be, for example, main memory 208 or a cache such as found in north bridge and memory controller hub 202. A processing unit may include one or more processors. The depicted examples in FIGS. 1-2 and above-described examples are not meant to imply architectural limitations. For example, data processing system 200 also may be a tablet computer, laptop computer, or telephone device in addition to taking the form of a PDA.

As used herein, the term "server" refers to a computer system, or portion thereof, on which a computer program being debugged is running, and the term "client" refers to an application development tool that is being used to debug that computer program. Accordingly, it will be appreciated that, as these terms are used herein, the client and the server may reside on separate computer systems that are in communication with one another (for example, by way of a network), on the same single computer system, or even, in the case of a Java environment, on the same JVM. When debugging an application that is running on a server, a channel will have been established between the client and the server. This channel is used to enable the client to send debugging commands to the server, and to enable the server to send information to the client.

Figure 3A:
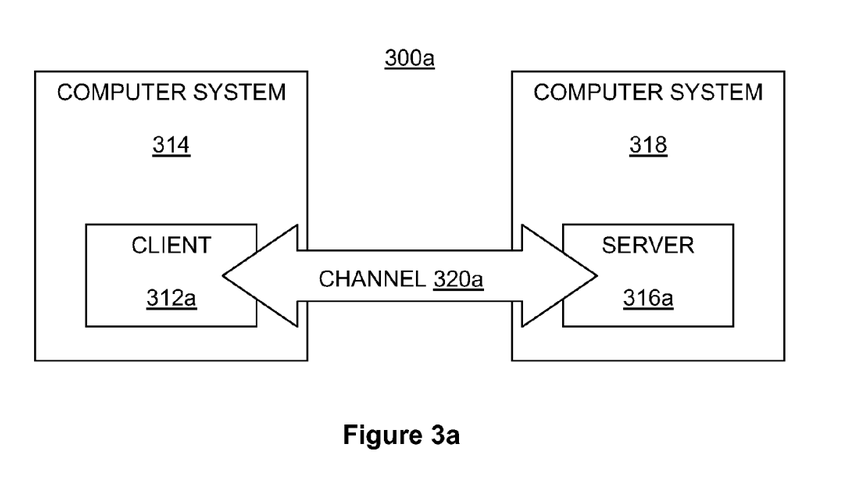
FIG. 3a is a schematic representation of two coupled computer systems and on which aspects of the present invention may be implemented.

With reference now to FIG. 3a, there is shown a first exemplary arrangement 300a in conjunction with which aspects of the present invention may be implemented, where the client and the server reside on separate computer systems. In particular, the client 312a resides on a first computer system 314, and the server 316a resides on a second computer system 318. A channel 320a between the client 312a and the server 316a enables the client 312a to send debugging commands to the server 316a, and enables the server 316a to send information to the client 312a.

Figure 3B:
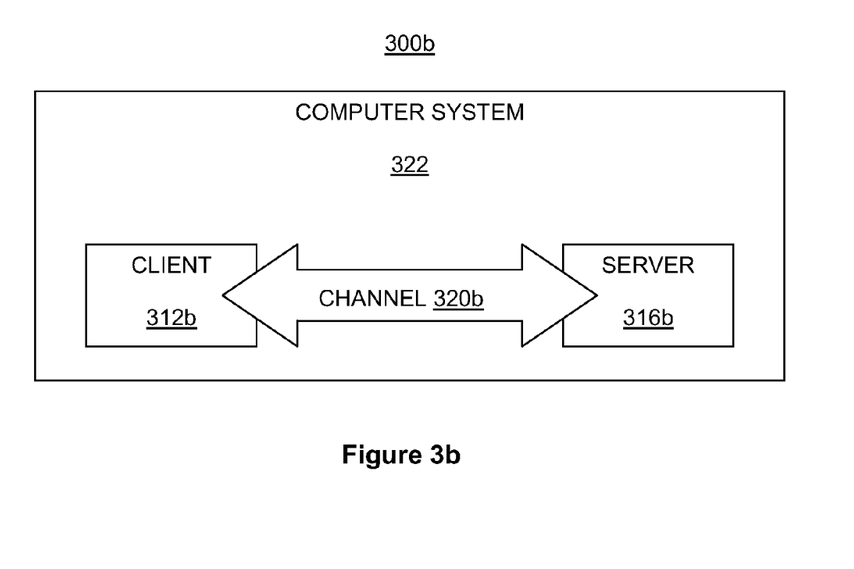
FIG. 3b is a schematic representation of a single computer system on which aspects of the present invention may be implemented.

Now referring to FIG. 3b, there is shown a second exemplary arrangement 300b in conjunction with which aspects of the present invention may be implemented, in which a client 312b and a server 316b reside on a single computer system 322. Analogously to the arrangement shown in FIG. 3a, a channel 320b between the client 312b and the server 316b enables the client 312b to send debugging commands to the server 316b, and enables the server 316b to send information to the client 312b.

Systems that support HCR use the channel (such as channel 320a, 320b) between the client 312a, 312b and the server 316a, 316b (respectively) for an additional function, namely to send the units of code containing the developer's modifications to the program being debugged from the client 312a, 312b to the server 316a, 316b (respectively). Thus, the client 312a, 312b (the application development tool) would build the single file representing the developer's changes to a particular portion of code, and this file would then be transmitted along the channel 320a, 320b to the server 316a, 316b (respectively), at which point the debug portion of the server 316a, 316b would immediately replace the running version of that file (e.g. a Java class) so as to enable immediate testing of the modifications.

As was noted above, the engines for executing programs written in high-level languages are frequently incompatible with the HCR functionality provided for the lower level base language used to cause the computer to implement the instructions embodied in source code written in the high-level language. According to an aspect of the present invention, a mechanism is provided by which changed programs can be delivered to an engine that has an application programming interface (API) for replacing running code, even if it is running on a remote server. This mechanism can deliver such changed programs even where the changed program, after being interpreted by its own intermediate software layer, will ultimately be implemented by a different intermediate software layer (typically one written in a base language) and does not require the complexity of a separate channel to transfer the altered programs. Moreover, the mechanism provided can leverage HCR capabilities provided by that other intermediate software layer. For example, where the underlying programming system is a JVM compatible with Eclipse, the mechanism can leverage the Java HCR provided by Eclipse. This invention assumes that the engine that executes the high level language has an API for replacing running code, much as the JVM does. Accordingly, one aspect of this invention is a mechanism for providing user-updated code to a running engine.

Engines that interpret high level languages and which support debugging typically have "hooks" in the runtime which are callbacks to a debug runtime. Hooks represent the convention of calling a method or procedure in the debug runtime at regular defined intervals within the engine for the high-level language. The debug runtime is thereby given a chance to check if a breakpoint is pending at that point in the high-level program. The debug runtime can also perform other functions, such as HCR.

The callbacks are the mechanism by which the debugger can implement breakpoints, stepping, etc. In accordance with an aspect of the present invention, these hooks may be used to implement HCR as well. According to an aspect of the present invention, the debug callback code will include an instruction to check to see if HCR has occurred, and if so, to provide the modified code to the engine. In order to do this, it is necessary to transport the modified high-level language code to the engine that will interpret it.

Because the software that generates the modified high-level language code may be running on a different machine than the engine that will interpret it, it is necessary to transport the modified high-level language code on a channel that can transport between machines. Setting up an autonomous channel for this purpose can be complex, may contravene security protocols, and can also be slow. According to an aspect of the present invention, an HCR mechanism provided by the base language tooling (such as Java in Eclipse) may be used to effect the transport of the high level language code.

Figure 4:
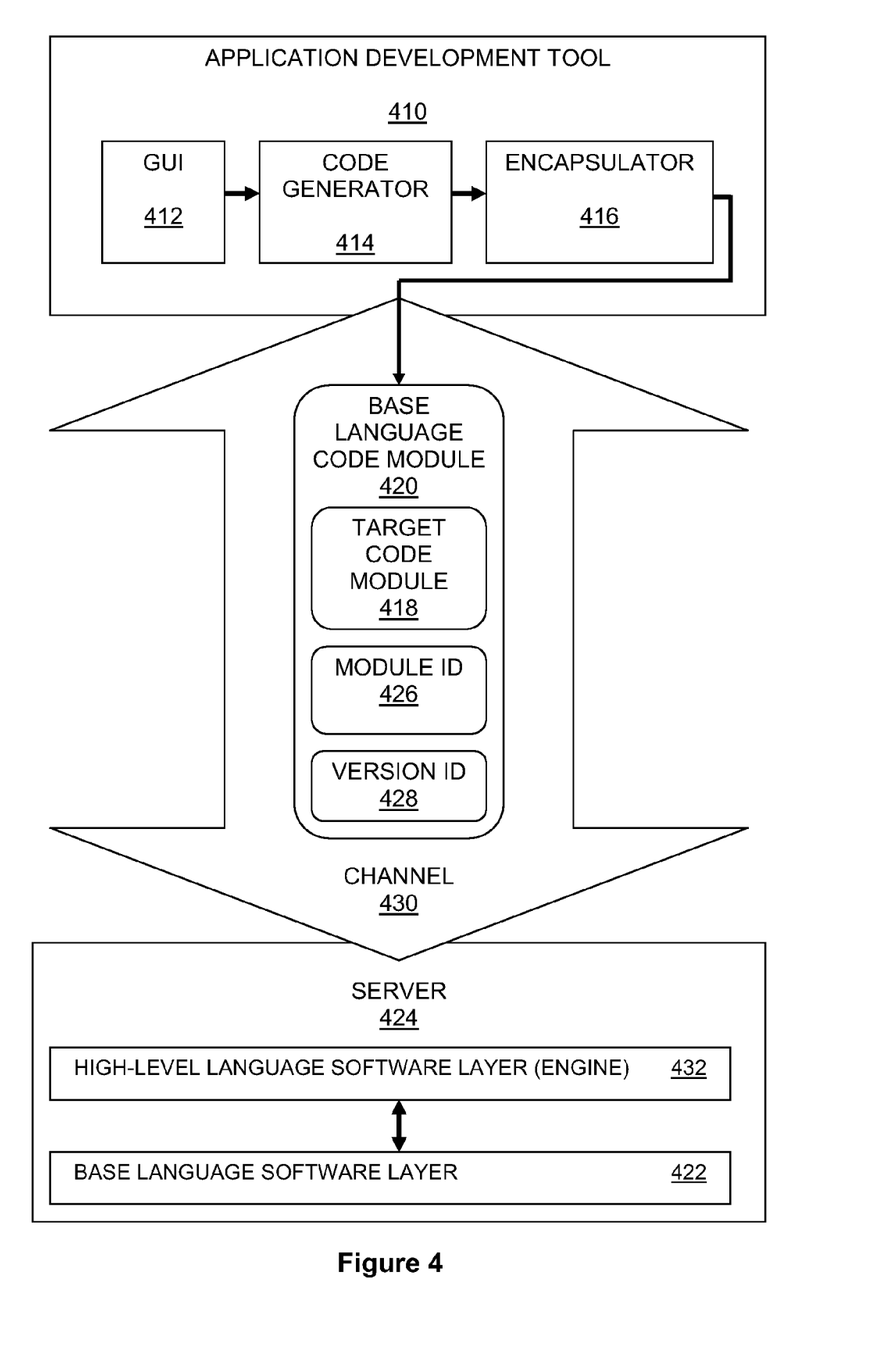
FIG. 4 is a schematic representation of a system for transporting a target code module in accordance with an aspect of the present invention.

Referring now to FIG. 4, a computer-implemented system for transmitting a target code module (for example, a module written in a high-level language) to a server that is executing a computer program capable of using the target code module, is schematically illustrated.

An application development tool 410 (i.e. a client) comprises a graphical user interface (GUI) 412, a code generator 414, and an encapsulator 416. The application development tool 410 is connected to a server 424 by way of a channel 430. In relation to FIGS. 3a and 3b, the application development tool 410 corresponds to the client 312a, 312b, the server 424 corresponds to the server 316a, 316b and the channel 430 corresponds to the channel 320a, 320b. The server 424 comprises an underlying base language software layer 422 and a high-level language software layer 432 (that is, an engine 432).

In one example, a human programmer (not shown) would use the GUI 412 to make modifications to a computer program written in a high-level language. The GUI 412 would transfer the changes to the code generator 414, which would produce modified code embodying the human programmer's changes. The modified code would then be transferred to the encapsulator 416. The encapsulator 416 would then convert the modified code into a target code module 418 and encapsulate the target code module 418 in a base language code module 420. The base language code module 420 is a code element written in the base language that can be executed by the underlying intermediate software layer 422 for the base language. As noted above, this base language software layer resides on the server 424 to which the modified code is to be transmitted. One preferred example of a base language is Java, in which case the base language code module 420 may be a Java class. Typically, the modified code, and hence the target code module 418, is written in a high-level language. Once the target code module 418 has been encapsulated within the base language code module 420, the base language code module 420 is transmitted via the channel 430 to the server 424. Even where the target code module 418 is written in a high-level language, because it is encapsulated within the base language code module 420, it can be transported along the channel 430 used for the base language. The base language code module 420 having the target code module 418 encapsulated therein will then be received by the server 424 and processed by the HCR functionality within the base language software layer 422. The target code module 418 can then be extracted from the base language code module 420 and provided to the engine 432 that will execute the target code module by means of appropriate APIs (not shown).

In a preferred embodiment, the encapsulator 416 represents the target code module 418 as a character string, and builds a base language code module 420 having a first parameter comprising that character string. Because the target code module is generally in the form of a human-readable computer programming language made up of characters, such as ASCII characters, it is usually quite feasible to represent the target code module as a string of characters. (ASCII stands for American Standard Code for Information Interchange, and comprises a set of binary codes used to represent letters, numbers and punctuation characters within computers. ASCII characters are those letters, numbers and punctuation characters included within this set.) The Unicode Standard may be used as an alternative to ASCII. Other suitable character standards may also be used.

Preferably, the encapsulator 416 will include a module identifier 426, identifying the target code module 418, within the base language code module 420. The module identifier 426 may comprise, for example, a meaningful representation of the name of the target code module 418. In one embodiment, the module identifier 426 is a parameter of the base language code module, and is represented by a character string. Also preferably, the encapsulator 416 will further include a version identifier 428 within the base language code module 420. The version identifier 428 provides an identification of the revision number of the target code module 418, and in one embodiment the version identifier 428 is a parameter of the base language code module 420 and is represented by an integer. In a particular preferred embodiment, the server 426 will have a corresponding record (not shown) of the version identifier 428 which, upon system startup, will be initialized to a default value of −1. In the application development tool 410, when the encapsulator 416 creates the first base language code module 420 for a particular target code module 418, it will set the value of the version identifier 428 to 0, and for each subsequent base language code module 420 for a particular target code module 418 (corresponding to a new iteration of that target code module 418), the encapsulator 416 will increment the version identifier by 1. The server 424 will, upon receipt of each base language code module 420 having a new version of a particular target code module embodied therein, check the value of the version identifier 428. This enables the server 424 to track the current version of the target code module 418, and also enables error checking (e.g. whether the server 424 failed to receive the base language code module 420 for a particular version of a given target code module 418).

Thus, the debug runtime for the application development tool 410 includes a base language code module 420 (a class, in the case of a Java-based system) which, in a particular preferred embodiment, includes three elements: a module identifier 426, a version identifier 428, and a target code module 418. This base language code module is used as the medium by which modifications to the high level language program are transported to the engine (such as engine 432).

Figure 5A:
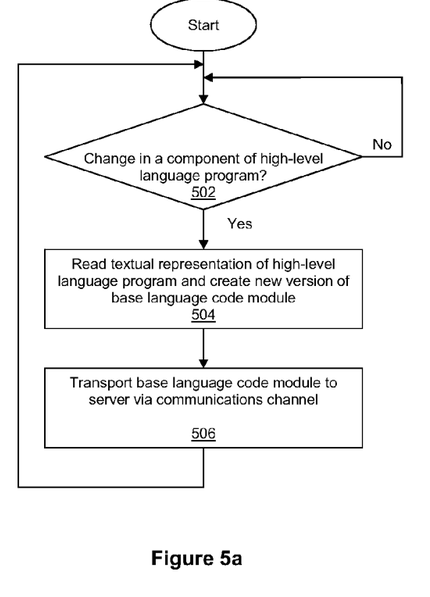
FIG. 5a is a flow chart showing a first exemplary process for transmitting a target code module to a server in accordance with an aspect of the present invention.
Figure 5B:
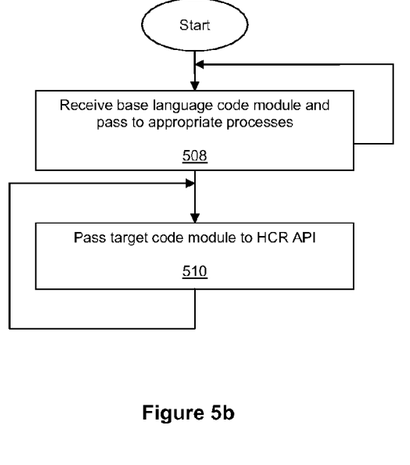
FIG. 5b is a flow chart showing a first exemplary process for receipt and processing of a target code module by a server in accordance with an aspect of the present invention.

With reference now to FIGS. 5a and 5b, two flow charts showing exemplary processes for implementing aspects of the present invention are shown. FIG. 5a represents a process occurring on a client according to an aspect of the present invention, and FIG. 5b represents a process occurring on a server according to an aspect of the present invention. It will be appreciated, as noted above, that the client on which the process depicted in FIG. 5a occurs (e.g. application development tool 410) will be in communication with the server (e.g. server 424) on which the process depicted in FIG. 5b occurs, for example by means of channel 430.

Referring first to FIG. 5a, at step 502, a client (such as application development tool 410 in FIG. 4) checks for a change in a component of a high-level language program. For example, a user may have modified the high-level language program, using a text editor or a visual editor, and then saved the modified program. The modified program is usually saved in the form of a textual representation of the program, such as an extensible markup language (hereinafter "XML") representation. Where a GUI, such as GUI 412 in FIG. 4, is used to make the changes, the modified code may be created (in response to the user input) and saved by the code generator 414. Where Eclipse is used as the application development tool, the change may be detected through the standard methodology of resource change listeners, which are provided within Eclipse. If the client does not detect a change in the high-level language program at step 502, the client continues to monitor for such a change.

At step 504, responsive to a determination that there has been a change in a component of a high-level language program, the newly saved textual representation of the high-level language program is read and used by the application development tool (for example by encapsulator 416 in FIG. 4) to create a new version of the base language code module (such as base language code module 420) having the textual representation encapsulated therein. This new version of the base language code module preferably has a version identifier (such as version identifier 428 in FIG. 4) having a value equal to the previous value plus 1. The new version of the base language code module also preferably has a module identifier (such as module identifier 426 in FIG. 4) having a value equal to the fully qualified name of the user's program. The name used is said to be fully qualified if it is sufficient to uniquely identify the program to the high-level language engine, which may be executing several different programs simultaneously.

At step 506, the client will send the base-language code module to the HCR mechanism provided for the intermediate software layer for the base language (such as intermediate software layer 422). The HCR mechanism will transport the base language code module (such as base language code module 420) to the server (such as server 424) via the communications channel (such as channel 430). Thus, the intermediate software layer for the base language (e.g. intermediate software layer 422) on the server (such as server 424) will now hold the new version of the base language code module (e.g. base language code module 420).

Reference is now made to FIG. 5b, where another process according to an aspect of the present invention is shown. The process shown in FIG. 5b would be carried out on a server, such as server 424.

At step 508, the server receives a base language code module (such as base language code module 420) and passes it to the appropriate processes within the server. Step 508 is preferably a recursive step, in that the server preferably continues to be able to receive further base language code modules while (and after) passing an earlier-received base language code module.

At step 510 the target code module (e.g. target code module 418) stored as a variable within the base language code module (e.g. base language code module 420) is passed to the HCR API for the engine, along with the value stored for the module identifier (e.g. module identifier 426). An engine (such as engine 432) for the high-level language will, as one of the standard activities executed by the debug runtime at a debug callback, check to see whether a component of the high-level language program has been modified. In an exemplary embodiment, the engine will check each incoming base language code module to determine whether the value of the version identifier (such as version identifier 428) for a particular component has been incremented. This enables the engine to update its database programs and begin executing the newly modified code embodied in the target code module.

In implementing aspects of the invention as described above, one issue that must be considered is the possibility that the user could change multiple high level language programs in quick succession. Because a single base language code module (e.g. base language code module 420) is used to move each change to the high-level language program (such as target code module 418), the possibility exists that a new change could be made before the previous change (in the form of target code module 418) is delivered to the engine (such as engine 432). There are at least two possible approaches available to address this.

Figure 6A:
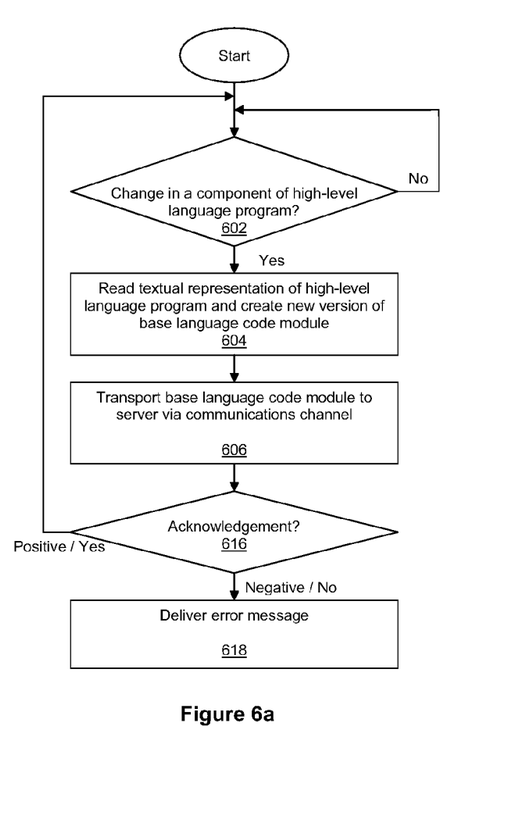
FIG. 6a is a flow chart showing a second exemplary process for transmitting a target code module to a server in accordance with an aspect of the present invention.
Figure 6B:
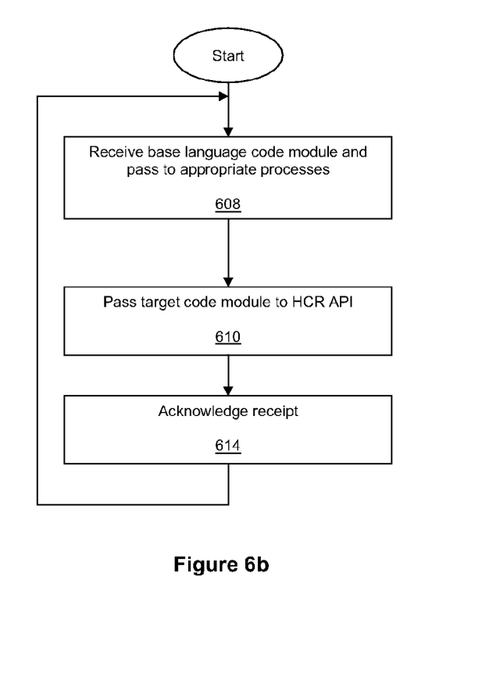
FIG. 6b is a flow chart showing a second exemplary process for receipt and processing of a target code module by a server in accordance with an aspect of the present invention.

One approach is an acknowledgment-based approach, as illustrated in FIGS. 6a and 6b. Analogously to FIGS. 5a and 5b, FIG. 6a shows a process carried out on a client, and FIG. 6b shows a process carried out on a server.

Referring first to FIG. 6a, at step 602 a client (such as application development tool 410 in FIG. 4) checks for a change in a component of a high-level language program. If no change is detected, the client continues to monitor for a change. At step 604, responsive to a determination that there has been a change in a component of a high-level language program, the application development tool creates a new version of the base language code module (such as base language code module 420) having the module corresponding to the change (such as target code module 418) encapsulated therein. At step 606, the client will send the base language code module to the HCR mechanism provided for the intermediate software layer for the base language (such as intermediate software layer 422), so that the base language code module is communicated to the server (for example by channel 430). Steps 602, 604 and 606 are analogous to steps 502, 504 and 506 in FIG. 5a.

At step 616, the client (such as application development tool 410) waits for acknowledgement. This step will be described further below.

Now referring to FIG. 6b, at step 608 the server receives a base language code module (such as base language code module 420) and passes it to the appropriate processes within the server. At step 610, the target code module (e.g. target code module 418) stored as a variable within the base language code module (e.g. base language code module 420) is passed to the HCR API for the engine so that the engine can begin executing the newly modified code embodied in the target code module. Steps 608 and 610 are analogous to steps 508 and 510 in FIG. 5b, and some detail has been omitted from the above description to avoid repetition.

At step 614, after the target code module (such as target code module 418) has been passed to the HCR API for the engine (such as engine 432) and the HCR process has completed, the server sends an acknowledgement to the client (such as application development tool 410). This acknowledgement may be transmitted through the channel used by the base level HCR mechanism (e.g. channel 430). In one embodiment, only a positive acknowledgement is transmitted, following successful completion of the HCR process (i.e. no acknowledgement is sent when the HCR process fails). In another embodiment, a positive acknowledgement is sent when the HCR process completes successfully, and a negative acknowledgement is sent when the HCR process fails. Such a negative acknowledgement can optionally provide additional information, such as one or more reasons why the HCR process was unsuccessful.

As noted above, at step 616, the client awaits acknowledgement from the server. In the embodiment where only a positive acknowledgement will be sent, the client (e.g. application development tool 410) may wait a predetermined period of time to receive the acknowledgement following transmission of the base language code module. If no acknowledgement is received within the predetermined period of time, the client concludes that the HCR process failed. In the embodiment in which both positive and negative acknowledgements are sent, the client will know from a negative acknowledgement that the HCR process failed. In either case, the client (such as application development tool 432) preferably will not transmit any further changes in high-level language programs to the server until an acknowledgement has been received. Preferably, following a failed acknowledgement or a negative acknowledgment, the client (e.g. application development tool 410) will not attempt HCR for any subsequent changes to that high level language program, until the change for which HCR failed has been successfully implemented. At step 618, in the case of a failed acknowledgement, or if the client receives a negative acknowledgment, the client delivers a message to the user that HCR has failed. Optionally, a user may be permitted to override the system and direct that changes made subsequent to the failed HCR process be processed. If a positive acknowledgment is received at step 616, the process returns to step 602 to await the next change in a component of the high-level language.

Optionally (not shown in FIG. 6a), if the implementation technique chosen is to directly generate the revised base language code module (such as base language code module 420) in memory, as will be discussed in greater detail below, then the application development tool can continue to generate various new versions of the base language code module, despite failure of the HCR process for a particular base language code module. These new base language code modules will simply be binary arrays in memory, and will not actually be executing. The HCR mechanism provided for the base language can then be triggered for each base language code module in succession, once appropriate acknowledgements have been received for previously triggered updates.

Another method by which to address the possibility that the user could change multiple high level language programs in quick succession is to maintain a rolling history in the base language code module. The base language code module, such as base language code module 420, can be modified in structure so that it holds updates to potentially several high-level language programs. As updates are made, they are appended to an update list, which will reference all of the updates that are currently valid and are awaiting transport to the server. If this method is used, it is desirable to limit the size of the update list, for example by causing updates that were made more than a predetermined number of seconds ago to be expunged. While the implementation of a rolling history approach is more complex than the acknowledgement-based approach, it can be used in cases where the acknowledgement-based approach is not practical. For example, a rolling history approach can be used where network delays associated with waiting for acknowledgement are expected to be lengthy.

Figure 7A:
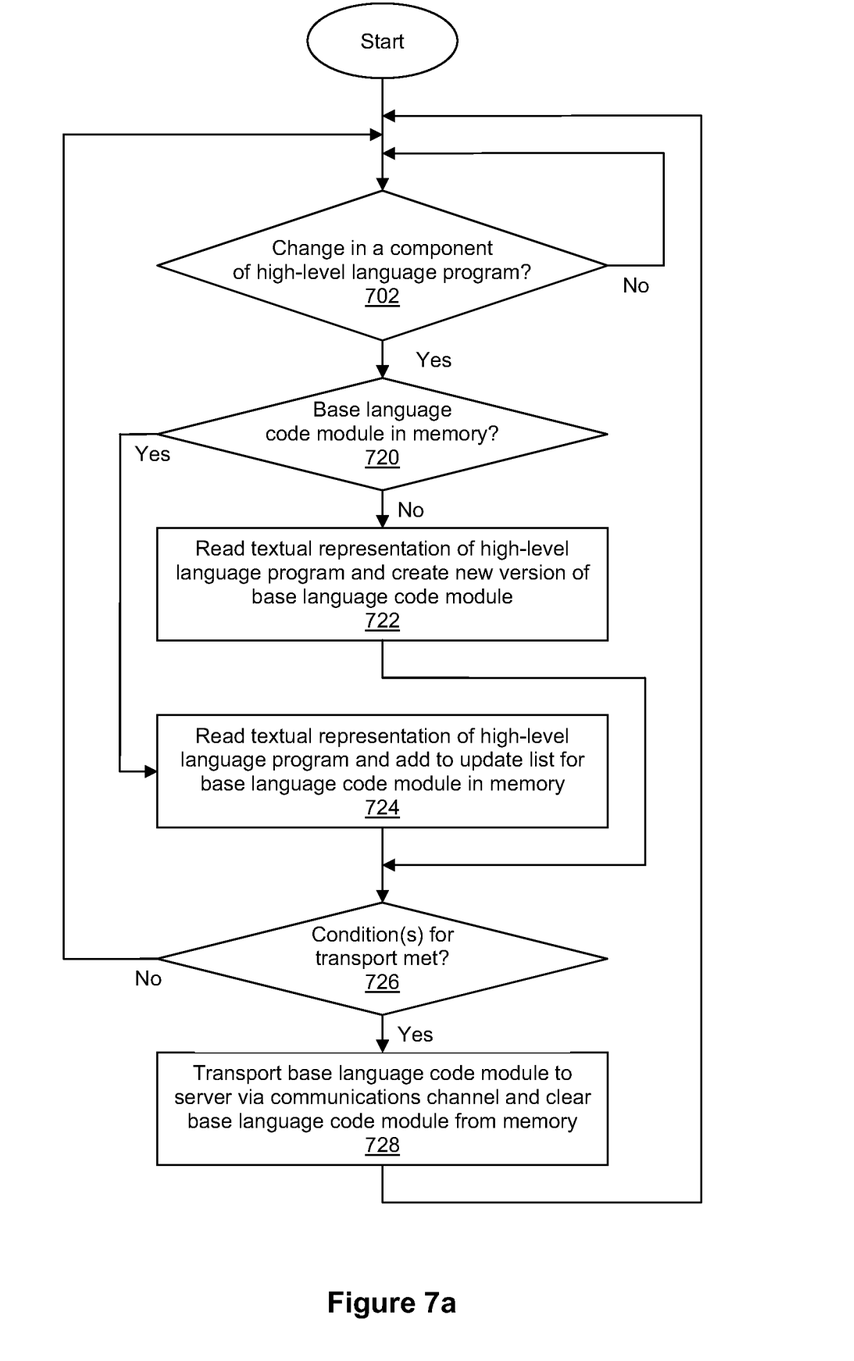
FIG. 7a is a flow chart showing a third exemplary process for transmitting a target code module to a server in accordance with an aspect of the present invention.
Figure 7B:
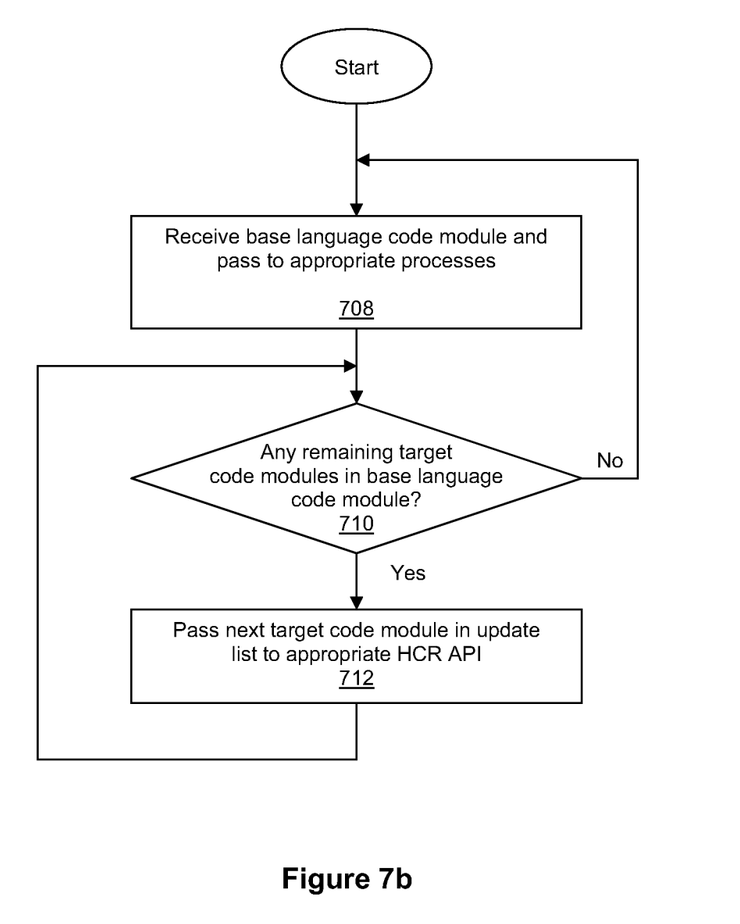
FIG. 7b is a flow chart showing a third exemplary process for receipt and processing of a target code module by a server in accordance with an aspect of the present invention.

With reference now to FIGS. 7a and 7b, there are shown exemplary processes for using a rolling history technique to track successive changes to one or more high-level language programs. Analogously to FIGS. 5a and 5b and 6a and 6b, FIG. 7a shows a process carried out on a client, and FIG. 7b shows a process carried out on a server.

Referring first to FIG. 7a, at step 702 the client checks for a change in a component of a high level language. If no change is detected, the process continues to monitor for when a change occurs. At step 720, responsive to a determination that there has been a change in a component of the relevant high-level language program, the client checks whether a base language code module already exists in memory. If no base language code module exists, then at step 722 the client reads the textual representation of the high-level language program and creates a new version of the base language code module with the textual representation of the high-level language program encapsulated therein. If at step 720 it is determined that a base language code module already exists in memory, then at step 724 the client reads the textual representation of the high-level language program and appends it to the update list in the existing base language code module so that the high-level language program is encapsulated in the base language code module.

At step 726, regardless of whether a new base language code module was created (step 722) or the high-level language program was added to an existing base language code module (step 724), the client checks whether the condition(s) for transport of the base language code module to the server have been satisfied. One exemplary condition for transport of the base language code module to the server could be that a threshold number of updates are stored in the base language code module. For example, if the user is modifying several high level programs as part of a group, it may be desirable to wait until all the updates are completed before transporting the updates to the server.

If at step 726 the condition(s) for transport of the base language code module to the server have been met, then the client will, at step 728, transport the base language code module to the server and then clear the base language code module from the memory portion allocated to the current base language code module. It should be noted here that a copy of the base language code module may be retained in another portion of memory, or in a storage medium, even though it has been cleared from the memory portion it previously occupied. Such copy may be useful, for example, in case of a problem with the HCR process on the server. After the client has transported the base language code module to the server at step 728, the client returns to step 702 to wait for the next change in a component of a high-level language program.

If at step 726 the condition(s) for transport of the base language code module to the server have not been met, the client returns to step 702 to await the next change in a component of a high-level language program.

With reference now to FIG. 7b, there is shown an exemplary process carried out by a server (for example server 424) for receipt and processing of a base language code module containing a plurality of target code modules embodying modifications to one or more high-level language programs.

At step 708, the server (such as server 424) receives the base language code module and passes it to the appropriate processes. At step 710, the server (such as server 424) checks whether there are any target code modules remaining within the base language code module. If it is determined at step 710 that at least one target code module remains within the base language code module, then at step 712 the server passes the next target code module (for example, the next target code module in the update list) to the appropriate HCR API, and then returns to step 710 to check if there are any further target code modules in the base language code module. Optionally (not shown), if at step 710 it is determined on the first test of a newly received base language code module that there are no remaining target code modules (i.e. the base language code module was empty), an error message can be returned to the client. If the server determines at step 710 that there are no further target code modules in the base language code module, then the server returns to step 708 to await the next base language code module.

Although not shown, it is to be appreciated that the acknowledgement-based approach described in the context of FIGS. 6a and 6b can be combined with the rolling history approach.

One factor in implementing aspects of the present invention is the means by which the application development tool is to construct the base language code module when modified code is saved by the user.

In one embodiment, the application development tool, such as application development tool 410, can (either automatically or in response to user commands) construct a new program in source code and save it to disk. In a particular exemplary embodiment, where Java is the base language, the application development tool would construct the source code for a new class, and save it with a suitable file name (e.g. "Transport.java"). The saving of the program would trigger a builder, which would generate a new class file (e.g. base language code module 420) using a compiler. The saving of the new class file would in turn trigger the base language HCR mechanism, which would read the class and transport it to the server using the debug channel (e.g. channel 430). This mechanism is simple, but is not necessarily the most efficient.

An alternative approach, which may be more efficient, is to directly construct a new in-memory version the base language code module (e.g. base language code module 420), thereby avoiding the compilation step. In the case of Eclipse and Java, a new class file could be generated using one of the commonly available byte-code manipulation libraries, such as Byte Code Engineering Library (BCEL). In the case of the exemplary embodiment described with respect to FIG. 4, in-memory construction of a base language code module is relatively straightforward, because the structure of exemplary base language code module 420 is simple, namely, an integer and two strings. Once the base language code module has been generated directly in memory, the base language HCR mechanism can be triggered internally, without the need to even save the base language code module to non-volatile storage.

Furthermore, the invention can take the form of a computer program product accessible from one or more computer-usable or computer-readable storage device providing program code for use by or in connection with a computer or any instruction execution system. For the purposes of this description, a computer-usable or computer readable storage device can be any tangible apparatus that can store the program for use by or in connection with the instruction execution system, apparatus, or device.

The computer-readable storage device can be an electronic, magnetic, optical, electromagnetic, or semiconductor system (or apparatus or device). Examples of a computer-readable storage devices include, but are not limited to, a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-RAN) and DVD. The term "computer-readable storage device" does not encompass a signal propagation media such as a copper transmission cable, an optical transmission fiber or wireless transmission media.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

While the description of the present invention is directed toward the case where a target code module is written in a high-level language, it is to be appreciated that systems, software and methods according to the present invention may also be used to transport a target code module written in a base language. Such an approach may be desirable, for example, where the base language in which the target code module is written is different from the base language in which the base language code module is written, and HCR for the language of the target code module is not supported.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method of transmitting a target code module to a server that is executing a computer program capable of using the target code module, the method comprising:
 establishing a channel between a client and a server, the channel configured to transport base language code modules to the server;
 receiving, from a human, a first target code module;
 encapsulating the first target code module in a base language code module wherein encapsulating the first target code module in the base language code module comprises representing the first target code module as a character string and building the base language code module having a first parameter comprising the character string wherein the base language code module has a second parameter comprising a module identifier for the first target code module, wherein the base language code module has a third parameter comprising a first version identifier for the first target code module and a new version of the base language code module, wherein the new version has a second version identifier different from the first version identifier;

transmitting the base language code module to the server;

determining that a change has occurred in the first target code module to form a second target code module, wherein the second target code module is written in a high level language;

responsive to the determination that the change has occurred, creating the new version of the base language code module corresponding to the second target code module, wherein the base language code module is a Java class; and transmitting the new version of the base language code module to the server.

2. The method of claim 1, wherein the first target code module is written in the high level language, the method further comprising:

determining that an acknowledgment is not received in a predetermined period of time after transmitting the new version of the base language code module to the server; and responsive to the determination that the acknowledgment is not received, returning an error message.

3. A computer-implemented method of obtaining a target code module for integration into an executing computer program capable of using the target code module, the method comprising:

receiving a first base language code module having the target code module encapsulated therein;

extracting the target code module from the first base language code module, wherein encapsulating the first target code module in the base language code module comprises representing the first target code module as a character string and building the base language code module having a first parameter comprising the character string wherein the base language code module has a second parameter comprising a module identifier for the first target code module, wherein the base language code module has a third parameter comprising a first version identifier for the first target code module and a new version of the base language code module, wherein the new version has a second version identifier different from the first version identifier;

determining that a second base language code module has a version number more recent than a version number of the first base language code module;

attempting to hot code replace a second base language code module with the first base language code module, responsive to a determination that the second base language code module has the version number more recent than the version number of the first base language code module;

detecting a failure of hot code replacing the second base language code module with the first base language code module; and responsive to detecting the failure of hot code replacing, a server negatively acknowledging the first base language code module to a client.

4. The method of claim 3 wherein the target code module is written in a high level language.

5. A computer program product for causing transmission of a target code module to a server that is executing a computer program capable of using the target code module, the computer program product comprising:

one or more computer-readable tangible storage devices;

program instructions, stored on at least one of the one or more tangible storage devices, for establishing a channel between a client and a server, the channel configured to transport base language code modules to the server;

program instructions, stored on at least one of the one or more tangible storage devices, for receiving, from a human, a first target code module;

program instructions, stored on at least one of the one or more tangible storage devices, for causing encapsulation of the first target code module in a base language code module, wherein encapsulating the first target code module in the base language code module comprises representing the first target code module as a character string and building the base language code module having a first parameter comprising the character string wherein the base language code module has a second parameter comprising a module identifier for the first target code module, wherein the base language code module has a third parameter comprising a first version identifier for the first target code module and a new version of the base language code module, wherein the new version has a second version identifier different from the first version identifier;

program instructions, stored on at least one of the one or more tangible storage devices, computer-usable program code for causing transmission of the base language code module to the server;

program instructions, stored on at least one of the one or more tangible storage devices, for determining that a change has occurred in the first target code module to form a second target code module, wherein the second target code module is written in a high level language;

program instructions, stored on at least one of the one or more tangible storage devices, for creating the new version of the base language code module corresponding to the second target code module, wherein program instructions are responsive to a determination that the change has occurred, and the base language code module is a Java class; and program instructions, stored on at least one of the one or more tangible storage devices, for transmitting the new version of the base language code module to the server.

6. The computer program product of claim 5, wherein the first target code module is written in the high level language, the product further comprising:

program instructions, stored on at least one of the one or more tangible storage devices, for determining that an acknowledgment is not received in a predetermined period of time after transmitting the new version of the base language code module to the server; and program instructions, stored on at least one of the one or more tangible storage devices, for returning an error message, responsive to the determination that the acknowledgment is not received.

7. A computer program product for obtaining a target code module for integration into an executing computer program capable of using the target code module, the computer program product comprising:
one or more computer-readable tangible storage devices;
program instructions, stored on at least one of the one or more tangible storage devices, for receiving a first base language code module having the target code module encapsulated therein, wherein encapsulating the first target code module in the base language code module comprises representing the first target code module as a character string and building the base language code module having a first parameter comprising the character string wherein the base language code module has a second parameter comprising a module identifier for the first target code module, wherein the base language code module has a third parameter comprising a first version identifier for the first target code module and a new version of the base language code module, wherein the new version has a second version identifier different from the first version identifier;
program instructions, stored on at least one of the one or more tangible storage devices, for extracting the target code module from the first base language code module;
program instructions, stored on at least one of the one or more tangible storage devices, for determining that a second base language code module has a version number more recent than a version number of the first base language code module;
program instructions, stored on at least one of the one or more tangible storage devices, for attempting to hot code replace a second base language code module with the first base language code module, responsive to a determination that the second base language code module has the version number more recent than the version number of the first base language code number;
program instructions, stored on at least one of the one or more tangible storage devices, for detecting a failure to hot code replace the second base language code module with the first base language code module; and
program instructions, stored on at least one of the one or more tangible storage devices, for negatively acknowledging the first base language code module responsive to detecting the failure of hot code replacing.

8. The computer program product of claim 7 wherein the target code module is written in a high level language.

9. A data processing system comprising:
at least one processor;
a bus coupled to the processor;
at least one computer usable medium coupled to the bus, wherein the at least one computer usable medium contains a set of instructions and wherein the at least one processor is adapted to carry out the set of instructions by causing the data processing system to:
establish a channel between a client and a server, the channel configured to transport base language code modules to the server;
receive, from a human, a first target code module;
encapsulate the first target code module in a base language code module, wherein encapsulating the first target code module in the base language code module comprises representing the first target code module as a character string and building the base language code module having a first parameter comprising the character string, wherein the base language code module has a second parameter comprising a module identifier for the first target code module, wherein the base language code module has a third parameter comprising a first version identifier for the first target code module and a new version of the base language code module, wherein the new version has a second version identifier different from the first version identifier;
transmit the base language code module to the server;
determine that a change has occurred in the first target code module to form a second target code module, wherein the second target code module is written in a high level language;
create a new version of the base language code module corresponding to the second target code module, wherein creating the new version of the base language code module is responsive to the determination that the change has occurred, and the base language code module is a Java class; and
transmit the new version of the base language code module to the server.

10. The data processing system of claim 9, wherein the first target code module is written in the high level language wherein the at least one processor is adapted to cause the data processing system to determine that an acknowledgment is not received in a predetermined period of time after transmitting the new version of the base language code module to the server; and, responsive to the determination that the acknowledgment is not received, return an error message.

11. A data processing system comprising:
at least one processor;
a bus coupled to the processor;
at least one computer usable medium coupled to the bus, wherein the at least one computer usable medium contains a set of instructions and wherein the at least one processor is adapted to carry out the set of instructions by causing the data processing system to:
receive a first base language code module having the target code module encapsulated therein, wherein encapsulating the first target code module in the base language code module comprises representing the first target code module as a character string and building the base language code module having a first parameter comprising the character string wherein the base language code module has a second parameter comprising a module identifier for the first target code module, wherein the base language code module has a third parameter comprising a first version identifier for the first target code module and a new version of the base language code module, wherein the new version has a second version identifier different from the first version identifier;
extract the target code module from the first base language code module;
determine that a second base language code module has a version number more recent than a version number of the first base language code module;
attempt to hot code replace a second base language code module with the first base language code module, responsive to a determination that the second base language code module has the version number more recent than the version number of the first base language code module;
detect a failure of hot code replacing the second base language code module with the first base language code module; and
negatively acknowledge the first base language code module to a client responsive to detecting the failure of hot code replacing.

12. The data processing system of claim 11 wherein the target code module is written in a high level language.

* * * * *